United States Patent
Jang et al.

(10) Patent No.: US 11,479,699 B2
(45) Date of Patent: Oct. 25, 2022

(54) ADHESIVE FILM FOR SEMICONDUCTOR

(71) Applicant: LG CHEM, LTD., Seoul (KR)

(72) Inventors: Jong Min Jang, Daejeon (KR); Heejung Kim, Daejeon (KR); Kwang Joo Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 209 days.

(21) Appl. No.: 16/957,494

(22) PCT Filed: Dec. 20, 2018

(86) PCT No.: PCT/KR2018/016352
§ 371 (c)(1),
(2) Date: Jun. 24, 2020

(87) PCT Pub. No.: WO2019/151645
PCT Pub. Date: Aug. 8, 2019

(65) Prior Publication Data
US 2020/0362209 A1    Nov. 19, 2020

(30) Foreign Application Priority Data

Feb. 2, 2018   (KR) .................. 10-2018-0013603
Dec. 7, 2018   (KR) .................. 10-2018-0157086

(51) Int. Cl.
| | | |
|---|---|---|
| *C09J 133/10* | (2006.01) | |
| *C09J 7/10* | (2018.01) | |
| *C08L 33/10* | (2006.01) | |
| *C08L 63/10* | (2006.01) | |
| *C09J 11/04* | (2006.01) | |
| *C09J 11/08* | (2006.01) | |

(52) U.S. Cl.
CPC ............ *C09J 133/10* (2013.01); *C08L 33/10* (2013.01); *C08L 63/10* (2013.01); *C09J 7/10* (2018.01); *C09J 11/04* (2013.01); *C09J 11/08* (2013.01); *C08L 2203/16* (2013.01); *C09J 2301/208* (2020.08)

(58) Field of Classification Search
CPC ......... B32B 27/18; B32B 27/20; B32B 27/30; B32B 27/308; C08F 20/00; C08F 20/02; C08F 20/10; C08F 20/12; C08F 20/14; C08F 20/16; C08F 20/18; C08F 20/20; C08F 20/30; C08F 20/32; C08L 33/00; C08L 33/02; C08L 33/04; C08L 33/06; C08L 33/062; C08L 33/064; C08L 33/066; C08L 33/068; C08L 33/08; C08L 33/10; C08L 33/12; C09J 133/08; C09J 133/10
See application file for complete search history.

(56) References Cited

U.S. PATENT DOCUMENTS

| | | | |
|---|---|---|---|
| 7,674,859 B2 | 3/2010 | Saiki et al. | |
| 2008/0206544 A1 | 8/2008 | Kim et al. | |
| 2009/0004829 A1 | 1/2009 | Saiki et al. | |
| 2012/0126380 A1 | 5/2012 | Uenda et al. | |
| 2014/0353848 A1 | 12/2014 | Park et al. | |
| 2014/0367883 A1 | 12/2014 | Hatakeyama et al. | |
| 2016/0040045 A1* | 2/2016 | Morita | C08L 61/00 524/561 |
| 2016/0336290 A1 | 11/2016 | Kim et al. | |

FOREIGN PATENT DOCUMENTS

| | | |
|---|---|---|
| JP | 2000-191987 A | 7/2000 |
| JP | 2002-076683 A | 3/2002 |
| JP | 2007-095829 A | 4/2007 |
| JP | 2009-503241 A | 1/2009 |
| JP | 2009-030043 A | 2/2009 |
| JP | 2009-286977 A | 12/2009 |
| JP | 2012-097255 A | 5/2012 |
| JP | 2012-124465 A | 6/2012 |
| JP | 2013-136766 A | 7/2013 |
| JP | 2014-056967 A | 3/2014 |
| KR | 10-2009-0004542 A | 1/2009 |
| KR | 10-2014-0140839 A | 12/2014 |
| KR | 10-2015-0073621 A | 7/2015 |
| KR | 10-2016-0058711 A | 5/2016 |
| KR | 10-2016-0126188 A | 11/2016 |
| TW | I421319 B | 1/2014 |
| WO | 2009-144925 A1 | 12/2009 |

OTHER PUBLICATIONS

Zidong Li, "Magnetically Conductive Adhesives", Manual of Modem Adhesive Technology, New Times Press, Jan. 2002, p. 646 with English translation (3 pages).
International Search Report issued for International Application No. PCT/KR2018/016352 dated Apr. 2, 2019, 4 pages.
Extended European Search Report issued for European Patent Application No. 18904040.5 dated Feb. 2, 2021, 8 pages.

* cited by examiner

*Primary Examiner* — Zachary M Davis
(74) *Attorney, Agent, or Firm* — Rothwell, Figg, Ernst & Manbeck, P.C.

(57) ABSTRACT

The present invention relates to an adhesive film for a semiconductor, including: a first layer including an adhesive binder and a heat-dissipating filler; and a second layer including an adhesive binder and a magnetic filler, which is formed on at least one surface of the first layer, wherein the adhesive film has a predetermined composition for the adhesive binder included in each of the first layer and the second layer.

16 Claims, No Drawings

ADHESIVE FILM FOR SEMICONDUCTOR

CROSS-REFERENCE TO RELATED APPLICATION(S)

This application is a 35 U.S.C. 371 National Phase Entry Application from PCT/KR2018/016352 filed on Dec. 20, 2018, designating the United States and claiming the benefits of filing dates of Korean Patent Application No. 10-2018-0013603 filed on Feb. 2, 2018 and Korean Patent Application No. 10-2018-0157086 filed on Dec. 7, 2018, the entire contents of which are incorporated herein by reference.

TECHNICAL FIELD

The present invention relates to an adhesive film for a semiconductor. More specifically, the present invention relates to an adhesive film for a semiconductor capable of improving reliability of semiconductor chips with improved physical curing properties and of realizing improved mechanical properties together with high heat resistance and adhesive strength, and further, realizing excellent thermal conductivity properties and electromagnetic wave absorption performance.

BACKGROUND OF THE INVENTION

Recently, as the tendency toward miniaturization, high functionalization, and large capacity of electronic equipment has been expanding and the need for densification and high integration of a semiconductor package has rapidly increased, the size of semiconductor chips has been becoming larger and larger. In terms of improvement of integration degree, the stack package method for stacking chips in multiple stages has gradually increased.

With the use of the semiconductor stack packages in multiple stages, the thickness of the chips has become thinner and the degree of integration of the circuit has increased. Consequently, the modulus of the chip itself has reduced, thereby causing problems in the manufacturing process or reliability of the final product.

In order to solve these problems, attempts have been made to strengthen the physical properties of adhesives used in the semiconductor packaging process.

In addition, recently, as the thickness of semiconductor chips has become thinner, it is problematic in that the chip is damaged in a conventional blade cutting process and thus the yield is lowered. In order to solve this problem, a manufacturing process of firstly cutting semiconductor chips with a blade and then polishing the same has been proposed.

In this manufacturing process, since the adhesive is not cut, it is cut using a laser, and then the adhesive is cut through an expanding process of a substrate film at a slow temperature.

Further, in recent years, a process of cutting an adhesive only through a low-temperature expansion process and a thermal contraction process has been applied without using a laser so as to protect the circuit on the chip.

Meanwhile, with a tendency of electronic equipment and electronic components to become light, thin, short, and small, the degree of integration of electrical devices has been increasing, and the amount of heat generated by electrical devices that are operated with electrical energy has been significantly increasing.

Thus, there is an increasing demand for improvement in the heat dissipation property for effectively dispersing heat generated in electronic equipment and dissipating it.

In addition, as the degree of integration of electronic devices becomes higher, the amount of electromagnetic waves generated is also increasing, and electromagnetic waves may leak through a joint, a connecting part, and the like of the electrical equipment to cause operation errors on other electrical devices or electrical components or cause adverse actions such as weakening of a body's immune function, and the like.

BRIEF DESCRIPTION OF THE INVENTION

The present invention provides an adhesive film for a semiconductor that is capable of improving reliability of semiconductor chips with improved physical curing properties and of realizing improved mechanical properties together with high heat resistance and adhesive strength, and of further realizing excellent thermal conductivity properties and electromagnetic wave absorption performance.

The present invention provides an adhesive film for a semiconductor, including: a first layer including an adhesive binder and a heat-dissipating filler; and a second layer including an adhesive binder and a magnetic filler, which is formed on at least one surface of the first layer, wherein the adhesive binder included in each of the first layer and the second layer includes a (meth)acrylate-based resin including a (meth)acrylate-based repeating unit containing an epoxy-based functional group and a (meth)acrylate-based repeating unit containing an aromatic functional group, a curing agent including a phenol resin, and an epoxy resin.

DETAILED DESCRIPTION OF THE INVENTION

Hereinafter, the adhesive film for a semiconductor according to specific embodiments of the present invention will be described in detail.

As used herein, the term 'filler' refers to a material filled into a composite sheet in order to provide specific properties such as thermal conductivity or electromagnetic absorption wave performance and the like.

As used herein, the weight average molecular weight refers to a weight average molecular weight (unit: g/mol) in terms of polystyrene measured by the GPC method.

In the process of measuring the weight average molecular weight in terms of polystyrene measured by the GPC method, a detector and an analytical column, such as a commonly known analysis apparatus and differential refractive index detector, can be used, and commonly applied temperature conditions, solvents, and flow rates can be used.

Specific examples of the measurement conditions may include a temperature of 30° C., chloroform as a solvent, and a flow rate of 1 mL/min.

According to one embodiment of the present invention, an adhesive film for a semiconductor may be provided, including: a first layer including an adhesive binder and a heat-dissipating filler; and a second layer including an adhesive binder and a magnetic filler, which is formed on at least one surface of the first layer, wherein the adhesive binder included in each of the first layer and the second layer includes a (meth)acrylate-based resin including a (meth)acrylate-based repeating unit containing an epoxy-based functional group and a (meth)acrylate-based repeating unit containing an aromatic functional group, a curing agent including a phenol resin, and an epoxy resin.

The present inventors conducted research on components that can be used for adhesion or packaging of semiconductor devices, and found through experiments that the adhesive film for a semiconductor including the adhesive binders having the specific composition described above and two types of layers including a heat-dissipating filler and a magnetic filler, respectively, can improve reliability of semiconductor chips with improved physical curing properties and can realize improved mechanical properties together with high heat resistance and adhesive strength, and can further realize excellent thermal conductivity properties and electromagnetic wave absorption performance, thereby completing the present invention.

The adhesive binder included in each of the first layer and the second layer may include a (meth)acrylate-based repeating unit containing an epoxy-based functional group and a (meth)acrylate-based repeating unit containing an aromatic functional group.

As the (meth)acrylate-based resin includes a (meth)acrylate-based repeating unit containing an aromatic functional group, the adhesive film for a semiconductor can secure higher compatibility and a higher bonding force between the components contained therein, can have high elasticity, and can have a relatively improved initial tensile modulus.

Further, as the (meth)acrylate-based resin includes a (meth)acrylate-based repeating unit containing an epoxy-based functional group, the adhesive film for a semiconductor can have a more uniform and rigid internal structure, so that high impact resistance can be ensured when ultra-thin wafers are stacked in multiple stages, and electrical properties can be improved after the manufacturing process of the semiconductor device.

Furthermore, the (meth)acrylate-based resin has a hydroxyl equivalent weight of 0.15 eq/kg or less, or 0.10 eq/kg or less, and thus it can be cured more smoothly and uniformly together with an epoxy, without interfering with the compatibility with other components of the resin composition, for example, the epoxy resin or the phenol resin. In particular, the adhesive film for a semiconductor can have a more uniform and rigid internal structure.

When the hydroxyl equivalent weight of the (meth)acrylate-based resin is high, for example, when it exceeds 0.15 eq/kg, the compatibility with the epoxy resin or the phenol resin may be reduced, and thus uniformity of the appearance properties and mechanical properties of the adhesive film for a semiconductor may be deteriorated.

The content of the (meth)acrylate-based functional group containing an aromatic functional group in the (meth)acrylate-based resin may be 2 to 40% by weight, 3 to 30% by weight, or 5 to 25% by weight.

When the content of the (meth)acrylate-based functional group containing an aromatic functional group in the (meth)acrylate-based resin is too low, the effect of increasing the compatibility with the epoxy resin or the phenol resin may be insignificant, and also the effect of reducing the hygroscopicity of the finally prepared adhesive film may be insignificant.

When the content of the (meth)acrylate-based functional group containing an aromatic functional group in the (meth)acrylate-based resin is too high, the adhesive strength of the adhesive film for a semiconductor may be deteriorated.

The aromatic functional group may be an aryl group having 6 to 20 carbon atoms, or an arylalkylene group containing an aryl group having 6 to 20 carbon atoms and an alkylene group having 1 to 10 carbon atoms.

The (meth)acrylate-based repeating unit containing an epoxy-based functional group may include a cycloalkylmethyl (meth)acrylate repeating unit having 3 to 20 epoxy-bonded carbon atoms.

The "cycloalkylmethyl having 3 to 20 epoxy-bonded carbon atoms" refers to a structure in which a cycloalkyl having 3 to 30 carbon atoms to which an epoxy group is bonded is substituted to a methyl group.

Examples of the cycloalkylmethyl (meth)acrylate having 3 to 20 epoxy-bonded carbon atoms include glycidyl (meth)acrylate, or 3,4-epoxycyclohexylmethyl (meth)acrylate, and the like.

Meanwhile, the (meth)acrylate-based resin may further include at least one repeating unit selected from the group consisting of a vinyl-based repeating unit containing a reactive functional group, and a (meth)acrylate-based functional group containing an alkyl group having 1 to 10 carbon atoms.

The reactive functional group may include at least one functional group selected from the group consisting of an alcohol, an amine, a carboxylic acid, an epoxide, an imide, a (meth)acrylate, a nitrile, a norbornene, an olefin, a polyethylene glycol, a thiol, and a vinyl group.

When the (meth)acrylate-based resin further includes at least one repeating unit selected from the group consisting of a vinyl-based repeating unit containing a reactive functional group and a (meth)acrylate-based functional group containing an alkyl group having 1 to 10 carbon atoms, the (meth)acrylate-based resin may include 0.1 to 20% by weight, or 0.5 to 10% by weight, of the (meth)acrylate-based repeating unit containing an epoxy-based functional group.

The (meth)acrylate-based resin may have a glass transition temperature of −10° C. to 20° C., or −5° C. to 15° C. By using the (meth)acrylate-based resin having the glass transition temperature mentioned above, the adhesive film for a semiconductor can secure high adhesive strength and can be easily prepared in the form of a thin film or the like.

Further, the (meth)acrylate-based resin may have a weight average molecular weight of 5000 to 1,000,000 or 100,000 to 900,000.

Meanwhile, in the adhesive film for a semiconductor, the weight ratio of the (meth)acrylate-based resin may be 0.55 to 0.95 relative to the total weight of the (meth)acrylate-based resin, epoxy resin, and phenol resin.

As the adhesive film for a semiconductor includes the (meth)acrylate-based resin in the range described above relative to the total weight of the (meth)acrylate-based resin, epoxy resin, and phenol resin, it can realize high elasticity, excellent mechanical properties, and high adhesive strength while exhibiting a relatively high initial tensile modulus.

When the weight ratio of the (meth)acrylate-based resin relative to the total weight of the (meth)acrylate-based resin, the epoxy resin, and the phenol resin is lower than the above range, the adhesiveness of the adhesive film for a semiconductor may be reduced, thus reducing the wettability of the wafer, so that it may not be possible to expect uniform cuttability. In terms of reliability, the adhesive strength may be reduced due to a decrease in the adherence at the interface between the wafer and the adhesive film, thereby deteriorating reliability.

When the weight ratio of the (meth)acrylate-based resin relative to the total weight of the (meth)acrylate-based resin, the epoxy resin, and the phenol resin is higher than the above range, the modulus of the adhesive film for a semiconductor generated at 5% to 15% elongation at room temperature may not be sufficient, and the elongation of the adhesive film may be greatly increased at room temperature.

In the adhesive film for a semiconductor, the weight ratio of the epoxy resin and the phenol resin may be controlled considering the properties of the finally-prepared product, and the weight ratio may be 10:1 to 1:10.

Meanwhile, the curing agent contained in the adhesive film for a semiconductor may include a phenol resin having a softening point of 100° C. or higher.

The phenol may have a softening point of 100° C. or higher, 110° C. to 160° C., or 115° C. to 150° C.

The adhesive film for a semiconductor may include a phenol resin having a relatively high softening point. The phenol resin having a softening point of 100° C. or higher, 110° C. to 160° C., or 115° C. to 150° C. may form a substrate (or matrix) of the adhesive component together with the liquid epoxy resin and the (meth)acrylate-based resin. Thus, the adhesive film can have a higher tensile modulus and excellent adhesive strength at room temperature, and can have flow properties that are optimized for semiconductors.

On the contrary, when the softening point of the phenol resin is less than the above-described range, the tensile modulus of the adhesive film for a semiconductor at room temperature may be decreased or the tensile elongation at room temperature may be greatly increased. Further, the melt viscosity of the adhesive film may be decreased or the modulus may be lowered. In addition, a phenomenon where the adhesive film may bleed out may frequently occur in the bonding process of the adhesive film or when the adhesive film is exposed to high temperature conditions for a long period of time.

Further, the phenol resin may have a hydroxyl equivalent weight of 80 to 400 g/eq, a hydroxyl equivalent weight of 90 to 250 g/eq, a hydroxyl equivalent weight of 100 to 178 g/eq, or a hydroxyl equivalent weight of 210 to 240 g/eq.

As the phenol resin has the hydroxyl equivalent weight in the above-mentioned range, a curing degree may be increased even with a short curing time, and thus the adhesive film for a semiconductor can have a higher tensile modulus and excellent adhesive strength at room temperature.

The phenol resin may include at least one selected from the group consisting of a bisphenol A novolac resin and a biphenyl novolac resin.

Meanwhile, the epoxy resin may function to control the curing degree of the adhesive film for a semiconductor, to increase the absorption performance, and the like.

Specific examples of the epoxy resin include at least one polymer resin selected from the group consisting of a biphenyl-based epoxy resin, a bisphenol A epoxy resin, a bisphenol F epoxy resin, a cresol novolac epoxy resin, a phenol novolac epoxy resin, a tetrafunctional epoxy resin, a triphenol methane-type epoxy resin, an alkyl modified triphenol methane-type epoxy resin, a naphthalene-type epoxy resin, a dicyclopentadiene-type epoxy resin, and a dicyclopentadiene modified phenol-type epoxy resin.

The epoxy resin may have a softening point of 50° C. to 120° C.

When the softening point of the epoxy resin is too low, the adhesive strength of the adhesive film for a semiconductor may increase and thereby decrease a pick-up property of chips after dicing, and when the softening point of the epoxy resin is too high, the flowability of the adhesive film for a semiconductor at a high temperature may be lowered, and the adhesive strength of the adhesive film for a semiconductor may be reduced.

The epoxy resin may have an epoxy equivalent weight of 100 to 300 g/eq.

The curing agent may further include at least one compound selected from the group consisting of an amine-based curing agent and an acid anhydride-based curing agent.

The amount of the curing agent used may be appropriately selected considering the physical properties of the finally-prepared adhesive film, and the like, and for example, it may be used in an amount of 10 to 700 parts by weight, or 30 to 300 parts by weight, based on 100 parts by weight of the epoxy resin.

The adhesive film for a semiconductor may further include a curing catalyst.

The curing catalyst may function to accelerate the action of the curing agent or the curing in the manufacturing process of the adhesive film for a semiconductor, and any curing catalyst known to be used in the manufacture of adhesive films for a semiconductor device or the like may be used without particular limitation.

For example, as the curing catalyst, at least one selected from the group consisting of a phosphorous-based compound, a boron-based compound, a phosphorus-boron-based compound, and an imidazole-based compound may be used. The amount of the curing catalyst used may be appropriately selected considering the physical properties of the finally-prepared adhesive film, and the like, and for example, it may be used in an amount of 0.5 to 10 parts by weight, based on 100 parts by weight of the total amount of the liquid and solid epoxy resins, the (meth)acrylate-based resin, and the phenol resin.

The adhesive film for a semiconductor may further include an ion scavenger including a metal oxide including at least one metal selected from the group consisting of zirconium, antimony, bismuth, magnesium, and aluminum; porous silicate; porous aluminosilicate; or zeolite.

Examples of the metal oxide including at last one metal selected from the group consisting of zirconium, antimony, bismuth, magnesium, and aluminum may include a zirconium oxide, an antimony oxide, a bismuth oxide, a magnesium oxide, an aluminum oxide, an antimony bismuth-based oxide, a zirconium bismuth-based oxide, a zirconium magnesium-based oxide, a magnesium aluminum-based oxide, an antimony magnesium-based oxide, an antimony aluminum-based oxide, an antimony zirconium-based oxide, a zirconium aluminum-based oxide, a bismuth magnesium-based oxide, a bismuth aluminum-based oxide, or a mixture of two or more thereof.

The ion scavenger may function to absorb metal ions or halogen ions and the like, which are present in the adhesive film for a semiconductor, and thus may improve electrical reliability of the wires in contact with the adhesive film.

The amount of the ion scavenger in the adhesive film for a semiconductor is not particularly limited, but considering the reactivity with transition metal ions, workability, and the like, it may be contained in the amount of 0.01 to 20% by weight, preferably 0.01 to 10% by weight, based on the weight of the adhesive film for a semiconductor.

Meanwhile, the adhesive film for a semiconductor may further include at least one additive selected from the group consisting of a coupling agent and an inorganic filler.

Specific examples of the coupling agent and inorganic filler are not particularly limited, and components known to be used in an adhesive for semiconductor packaging may be used without particular limitation.

As described above, the first layer may include an adhesive binder and a heat-dissipating filler.

The heat-dissipating filler may be used in the adhesive film for a semiconductor to exhibit an action or effect of rapidly delivering heat generated in electrical devices and the like to a heat sink.

Specific examples of the heat-dissipating filler include alumina ($Al_2O_3$), boron nitride (BN), aluminum nitride (AlN), silicon carbide (SiC), magnesium oxide (MgO), zinc oxide (ZnO), aluminum hydroxide ($Al(OH)_3$), or a mixture thereof.

As described above, the second layer may include an adhesive binder and a magnetic filler.

The magnetic filler may include soft magnetic metal alloy particles or ferrite-based magnetic particles.

The soft magnetic metal alloy particles may include a metal alloy that may be rapidly magnetized when a magnetic field is applied from the outside, and it may realize an action or effect of absorbing and removing electromagnetic wave noise of a specific frequency on the adhesive film for a semiconductor.

Specific examples of the magnetic particles may include an iron-silicon-aluminum alloy, an iron-silicon alloy, an iron-chromium-silicon alloy, an iron-chromium alloy, a nickel-iron alloy, carbonyl iron, a mixture thereof, an alloy thereof, and the like.

The ferrite-based magnetic particles are a ceramic-based material, and may include a material having a spinel structure that may be easily magnetized by an external magnetic field. Specific examples thereof may include nickel-iron ferrite, manganese-zinc ferrite, a mixture thereof, an alloy thereof, and the like.

The shape of the magnetic filler is not particularly limited, and for example, it may be spherical, circular, sheet-shaped, polyhedral, rotating-body-shaped, and the like.

As described above, the adhesive film for a semiconductor including each of the heat-dissipating filler and the magnetic filler in addition to the adhesive binder described above may have a feature of selectively absorbing radiated EMI noise observed with specific thermal conductivity properties and frequency according to the structure and composition.

Meanwhile, the first layer and the second layer may each have a thickness of 1 to 300 μm.

Further, the first layer and the second layer may each have a thickness of 1 μm or more, 3 μm or more, 5 μm or more, or 10 μm or more.

Furthermore, the first layer and the second layer may each have a thickness of 300 μm or less, 100 μm or less, 90 μm or less, or 70 μm or less.

The thickness ratio between the first layer and the second layer is not particularly limited, and in order to maximize the inherent effects described above, the ratio of the thickness of the second layer to the thickness of the first layer may be 0.2 to 5.

The tensile modulus of the adhesive film for a semiconductor may be 100 MPa or more when elongated up to 5% at a rate of 0.3 mils at room temperature.

Further, the modulus of the adhesive film for a semiconductor may be 55 MPa or more when elongated up to 10% at a rate of 0.3 mils at room temperature, and may be 40 MPa or more when elongated up to 15%.

The adhesive film for a semiconductor can be applied to a package having a multilayered structure of a semiconductor chip, and thus can realize a stable structure and excellent mechanical properties such as heat resistance and impact resistance, and can prevent the occurrence of reflow cracks. In particular, voids may not be substantially generated even when exposed to high temperature conditions for a long period of time which is applied in the manufacturing process of the semiconductor device.

The adhesive film for a semiconductor has a high breaking strength and low breaking elongation and thus can be applied to other non-contact-type adhesive cutting methods, for example, DBG (Dicing Before Grinding), as well as a wafer cutting method using a knife blade, and also has excellent cuttability even at a low temperature. Therefore, even when it is allowed to stand at room temperature, reliability and efficiency in the manufacturing process of the semiconductor device may be increased due to a low possibility of re-adhesion.

The adhesive film may be used as a die attachment film (DAF) for attaching a lead frame or a substrate with a die, or attaching a die with a die.

Thus, the adhesive film may be processed in the form of a die bonding film or a dicing die bonding film, and the like.

Advantageous Effects

According to the present invention, an adhesive film for a semiconductor capable of improving reliability of semiconductor chips with improved physical curing properties and of realizing improved mechanical properties together with high heat resistance and adhesive strength, and further capable of realizing excellent thermal conductivity properties and electromagnetic wave absorption performance, may be provided.

In addition, the adhesive film for a semiconductor can be applied to various manufacturing methods for semiconductor packages, can ensure high reliability in a process of bonding a semiconductor chip with a substrate or a supporting member, such as a lower layer chip or the like, and can realize excellent workability while ensuring heat resistance, moisture resistance, and insulation properties required when mounting a semiconductor chip to a semiconductor package.

The specific embodiments of the present invention will be described in more detail by way of examples shown below.

However, these examples are only illustrative of the specific embodiments of the present invention, and the content of the invention is not intended to be limited to or by these examples.

Synthesis Example 1: Synthesis of Thermoplastic Resin 1

70 g of butyl acrylate, 15 g of acrylonitrile, 5 g of glycidyl methacrylate, and 10 g of benzyl methacrylate were mixed with 100 g of toluene, and the mixture was reacted at 80° C. for about 12 hours to synthesize an acrylate resin 1 to which a glycidyl group was introduced as a branched chain (weight average molecular weight: about 900,000, glass transition temperature: 14° C.).

Then, the acrylate resin 1 was dissolved in dichloromethane, cooled, and titrated with a 0.1 N KOH methanol solution. Thus, it was confirmed that the hydroxyl equivalent weight was about 0.03 eq/kg.

Synthesis Example 2: Synthesis of Thermoplastic Resin 2

65 g of butyl acrylate, 15 g of acrylonitrile, 5 g of glycidyl methacrylate, and 15 g of benzyl methacrylate were mixed with 100 g of toluene, and the mixture was reacted at 80° C. for about 12 hours to synthesize an acrylate resin 2 to which a glycidyl group was introduced as a branched chain (weight average molecular weight: about 520,000, glass transition temperature: 14° C.).

Then, the acrylate resin 2 was dissolved in dichloromethane, cooled, and titrated with a 0.1 N KOH methanol solution. Thus, it was confirmed that the hydroxyl equivalent weight was about 0.03 eq/kg.

Synthesis Example 3: Synthesis of Thermoplastic Resin 3

60 g of butyl acrylate, 15 g of acrylonitrile, 5 g of glycidyl methacrylate, and 20 g of benzyl methacrylate were mixed with 100 g of toluene, and the mixture was reacted at 80° C. for about 12 hours to synthesize an acrylate resin 3 to which a glycidyl group was introduced as a branched chain (weight average molecular weight: about 520,000, glass transition temperature of 15° C.).

Then, the acrylate resin 3 was dissolved in dichloromethane, cooled, and titrated with a 0.1 N KOH methanol solution. Thus, it was confirmed that the hydroxyl equivalent weight was about 0.03 eq/kg.

Examples 1 to 3: Preparation of Adhesive Film for Semiconductor

1. Preparation of First Layer Including Adhesive Binder and Heat-Dissipating Filler (1) Example 1

4 g of phenol resin KA-1160 (manufactured by DIC Corporation, cresol novolac epoxy resin, epoxy equivalent weight: 190 g/eq, softening point: 65° C.), which is a curing agent of epoxy resin, 2 g of epoxy resin EOCN-103S (manufactured by Nippon Kayaku Co., Ltd., cresol novolac-type epoxy resin, epoxy equivalent weight: 214 g/eq, softening point: 80° C.), 5 g of liquid epoxy resin RE-310S (manufactured by Nippon Kayaku Co., Ltd, bisphenol A epoxy resin, epoxy equivalent weight: 180 g/eq), and 85 g of a filler, in which alumina fillers of CB-P05 and DAW-05 were mixed, were milled in the presence of a methyl ethyl ketone solvent using a milling machine.

Thereafter, 4 g of thermoplastic acrylate resin 1 (Mw: 520,000, glass transition temperature: 10° C.), 0.1 g of a silane coupling agent A-187 (manufactured by GE Toshiba Silicones, gamma-glycidoxypropyltrimethoxysilane), and 0.1 g of DICY and 0.1 g of 2MA-OK as curing accelerators were added to the above mixture and further milled for 2 hours to obtain a resin composition solution for semiconductor adhesion (solid concentration of 80 wt %).

This milled solution was applied to an automatic coating machine to obtain a first layer having a thickness of 20 μm.

(2) Examples 2 and 3

First layers having a thickness of 20 μm were obtained in the same manner as in Example 1, except for varying the compositions as shown in Table 1 below.

TABLE 1

| Composition of first layer (unit: g) | | | |
|---|---|---|---|
| | Example 1 | Example 2 | Example 3 |
| KA-1160 | 4 | | 3 |
| KPH-3075 | | 4 | |
| RE-310S | 5 | 4 | 5 |
| EOCN-103S | 2 | 2 | 1 |
| CB-P05 | 62 | 55 | 55 |
| DAW-05 | 23 | 30 | 30 |
| Acryl resin 1 | 4 | | |
| Acryl resin 2 | | 4 | |
| Acryl resin 3 | | | 6 |
| KG-3015P | | | |
| KG-3096 | | | |

(Description of Components Used)
KA-1160: Cresol novolac epoxy resin (manufactured by DIC Corporation, softening point: about 90° C., epoxy equivalent weight: 110 g/eq)
KPH-75: Xylock novolac resin (manufactured by DIC Corporation, softening point: about 75° C., epoxy equivalent weight: 175 g/eq)
RE-310S: Bisphenol A epoxy resin (epoxy equivalent weight: 218 g/eq, liquid)
EOCN-104S: Cresol novolac epoxy resin (manufactured by Nippon Kayaku Co., Ltd., epoxy equivalent weight: 180 g/eq, softening point: 90° C.)
NC-3000-H: Biphenyl novolac epoxy resin (epoxy equivalent weight: 180 g/eq, softening point: 65° C.)
<Fillers>
CB-P05: Alumina filler manufactured by Showa Denko, average particle diameter: 5 μm
DAW-05: Alumina filler manufactured by Denka, average particle diameter: 0.5 μm
<Acrylate Resins>
Acryl resin 1: Acrylic resin synthesized at a composition ratio of butyl acrylate:acrylonitrile:glycidyl methacrylate: benzyl methacrylate=70:15:5:10 (weight average molecular weight: about 900,000, glass transition temperature: 14° C.)
Acryl resin 2: Acrylic resin synthesized at a composition ratio of butyl acrylate:acrylonitrile:glycidyl methacrylate: benzyl methacrylate=65:15:5:15 (weight average molecular weight: about 520,000, glass transition temperature: 14° C.)
Acryl resin 3: Acrylic resin synthesized at a composition ratio of butyl acrylate:acrylonitrile:glycidyl methacrylate: benzyl methacrylate=60:15:5:20 (weight average molecular weight: about 520,000, glass transition temperature: 15° C.)
KG-3015: Acrylate-based resin (3% by weight of glycidyl methacrylate-based repeating units, weight average molecular weight: about 870,000, glass transition temperature: 10° C.)
KG-3096: Acrylate-based resin (3% by weight of glycidyl methacrylate-based repeating units, weight average molecular weight: about 150,000, glass transition temperature: 17° C.)
<Additives>
DICY: Dicyandiamide
2MAOK: Imidazole-based hardening accelerator
2. Preparation of Second Layer Including Adhesive Binder and Magnetic Filler
4 g of phenol resin KA-1160 (manufactured by DIC Corporation, cresol novolac resin, epoxy equivalent weight: 190 g/eq, softening point: 65° C.), which is a curing agent of epoxy resin, 2 g of epoxy resin EOCN-103S (manufactured by Nippon Kayaku Co., Ltd., cresol novolac-type epoxy resin, epoxy equivalent weight: 214 g/eq, softening point: 80° C.), 5 g of liquid epoxy resin RE-310S (manufactured by Nippon Kayaku Co., Ltd., bisphenol A epoxy resin, epoxy equivalent weight: 180 g/eq), and 85 g of a filler, in which Mn-ferrite and MnMgSr-ferrite fillers were mixed, were milled in the presence of a methyl ethyl ketone solvent using a milling machine.

Thereafter, 4 g of thermoplastic acrylate resin 1 (Mw: 900,000, glass transition temperature: 14° C.), 0.1 g of silane coupling agent A-187 (manufactured by GE Toshiba Silicones, gamma-glycidoxypropyltrimethoxysilane), and 0.1 g of DICY and 0.1 g of 2MA-OK as curing accelerators were added to the mixture above and further milled for 2 hours to obtain a resin composition solution for semiconductor adhesion (solid concentration of 80 wt %).

This milling solution was applied to an automatic coating machine to prepare a second layer having a thickness of 20 μm, which was formed on the first layer prepared above.

Experimental Examples: Evaluation of Physical Properties of Adhesive Films for Semiconductor Device To Experimental Example 1: Planarization of Films The surface of the adhesive films for a semiconductor device obtained in the above examples was planarized using a SUS roll heat laminating machine at 70° C., and the degree of planarization was measured as a center line average roughness (Ra) of the films using an optical profiler.

Experimental Example 2: Measurement of Thermal Conductivity of First Layer Films Only the first layers of the adhesive films for a semiconductor device obtained in the above examples were coated and planarized and then laminated to a thickness of 600 μm using a rubber roll laminating machine.

The thus-obtained films were cured to finally obtain cured films.

The specimens were prepared into specimens having a size of 10 mm×10 mm units, and the thermal conductivity was measured using a thermal conductivity analyzer LFA467 by means of a laser flash method.

Experimental Example 3: Measurement of Magnetic Permeability of Second Layer Films Only the second layers of the adhesive films for a semiconductor device obtained in the above examples were coated and planarized and then laminated to a thickness of several millimeters using a rubber roll laminating machine.

The thus-obtained films were cured into a toroidal shape to obtain samples. Using these samples, the magnetic susceptibility at different frequencies and the value of magnetization loss were measured using an impedance analyzer (E4991A) or a vector network analyzer (E5071C).

Experimental Example 4: Measurement of Viscosity of Films

The adhesive films for a semiconductor device obtained in the above examples were coated and planarized and then laminated so as to a thickness of 600 μm using a rubber roll laminating machine.

The films were prepared into 8 mm circular specimens and then measured for viscosity using ARES-G2 manufactured by TA.

Experimental Example 5: Measurement of Wafer Wettability

The films obtained by coating and planarizing the adhesive films for a semiconductor device obtained in the above examples were prepared into circular films having a diameter of 22 cm.

The films were laminated on a PO film coated with an adhesive layer to prepare dicing die-bonding films.

Separately, an 80 μm wafer was laminated onto a dicing film and cut into a size of 8 mm×8 mm. Then, while thermally laminating the wafer cut at 70° C. and the adhesive films using a mounting apparatus, it was determined whether or not the adhesive films were adhered.

Experimental Example 6: Simulation Experiment of Residual Void Removal During Curing The adhesive films for a semiconductor device obtained in the examples were prepared into circular films having a diameter of 22 cm. The films were laminated on a PO film coated with an adhesive layer to prepare dicing die-bonding films and subjected to thermal lamination with a wafer at 70° C. using a mounting apparatus.

Thereafter, the wafer and the adhesive films were diced into a size of 12 mm×10 mm.

Then, a heat-dissipating film was die-attached on the PCB, pressure curing was carried out at 7 atm, at 135° C. for 30 minutes, and then buriability of the heat-dissipating film was evaluated by scanning the entire PCB using an ultrasonic imaging apparatus.

TABLE 2

Results of Experimental Examples

| | | Example 1 | Example 2 | Example 3 |
|---|---|---|---|---|
| Roughness (Ra) | nm | 20 | 15 | 15 |
| Thermal conductivity | w/mK | 2.05 | 2.2 | 2.2 |
| b-stage | Pas@70° C. | 47558 | 33445 | 39445 |
| Viscosity | Pas@120° C. | 10700 | 5163 | 5863 |
| Non-adhesive part of wafer | % | 0 | 0 | 0 |
| Buriability | % | 100 | 100 | 100 |

As shown in Table 2, it was confirmed that the adhesive films for a semiconductor of Examples 1 to 3 had excellent thermal conductivity and wafer adhesive properties by including the acrylic resins in which the molecular weight and composition were controlled.

In addition, it can be seen that the value of magnetization loss at different frequencies for the EMI absorbing-material applied to the second layer of the examples had tan α=11 between 1 and 3 GHz, confirming that the adhesive films have the ability to absorb radiated EMI noise in this frequency range.

The invention claimed is:
1. An adhesive film for a semiconductor, comprising:
a first layer including a first adhesive binder and a heat-dissipating filler; and
a second layer including a second adhesive binder and a magnetic filler, the second layer positioned on at least one surface of the first layer,
wherein the first and second adhesive binders are the same as or different from each other and each includes a (meth)acrylate-based resin including a (meth)acrylate- based repeating unit containing an epoxy-based functional group and a (meth)acrylate-based repeating unit containing an aromatic functional group, a curing agent including a phenol resin, and an epoxy resin, and
wherein the (meth)acrylate-based resin has a hydroxyl equivalent weight of 0.15 eq/kg or less.

2. The adhesive film for a semiconductor of claim 1, wherein the (meth)acrylate-based repeating unit containing an aromatic functional group is contained in an amount of 2 to 40% by weight based on the total weight of the (meth)acrylate based resin.

3. The adhesive film for a semiconductor of claim 1, wherein the heat-dissipating filler includes at least one compound selected from the group of alumina ($Al_2O_3$), boron nitride (BN), aluminum nitride (AlN), silicon carbide (SiC), magnesium oxide (MgO), zinc oxide (ZnO), and aluminum hydroxide ($Al(OH)_3$).

4. The adhesive film for a semiconductor of claim 1, wherein the first layer includes 0.1 to 50% by weight of the heat-dissipating filler based on the total weight of the adhesive film.

5. The adhesive film for a semiconductor of claim 1, wherein the magnetic filler includes at least one compound selected from the group of an iron-silicon-aluminum alloy, an iron-silicon alloy, an iron-chromium-silicon alloy, an iron-chromium alloy, a nickel-iron alloy, carbonyl iron, nickel-zinc ferrite, and manganese-zinc ferrite.

6. The adhesive film for a semiconductor of claim 1, wherein the second layer includes the magnetic filler in an amount of 0.1 to 50% by weight based on the total weight of the adhesive film.

7. The adhesive film for a semiconductor of claim 1, wherein a weight ratio of the (meth)acrylate-based resin is 0.55 to 0.95 relative to the total weight of the (meth)acrylate-based resin, the epoxy resin, and the phenol resin.

8. The adhesive film for a semiconductor of claim 1, wherein the (meth)acrylate-based resin includes the (meth)acrylate-based repeating unit containing an aromatic functional group in an amount of 3 to 30% by weight based on the total weight of the (meth)acrylate-based resin.

9. The adhesive film for a semiconductor of claim 1, wherein the aromatic functional group is an aryl group having 6 to 20 carbon atoms; or an arylalkylene group containing an aryl group having 6 to 20 carbon atoms and an alkylene group having 1 to 10 carbon atoms.

10. The adhesive film for a semiconductor of claim 1, wherein the phenol resin has a softening point of at least 100° C.

11. The adhesive film for a semiconductor of claim 1, wherein the phenol resin includes at least one resin selected from the group of a bisphenol A novolac resin and a biphenyl novolac resin.

12. The adhesive film for a semiconductor of claim 1, wherein the epoxy resin has a softening point of 50 to 120° C.

13. The adhesive film for a semiconductor of claim 1, wherein the epoxy resin has an epoxy equivalent weight of 100 to 300 g/eq.

14. The adhesive film for a semiconductor of claim 12, wherein the first layer has a thickness of 1 to 300 μm, the second layer has a thickness of 1 to 300 μm, and a ratio of the thickness of the second layer to the thickness of the first layer is 0.2 to 5.

15. The adhesive film for a semiconductor of claim 1, wherein the (meth)acrylate-based resin has a weight average molecular weight of 5000 to 1,000,000.

16. The adhesive film for a semiconductor of claim 1, wherein the first layer has a thickness of 1 to 300 μm, the second layer has a thickness of 1 to 300 μm, and a ratio of the thickness of the second layer to the thickness of the first layer is 0.2 to 5.

* * * * *